(12) United States Patent
Schilling et al.

(10) Patent No.: US 7,250,577 B2
(45) Date of Patent: Jul. 31, 2007

(54) DEVICE FOR WEIGHING SUBSTANTIALLY UNIFORM WEIGHING OBJECTS

(75) Inventors: Peter Schilling, Siebnen (CH); Dominic Meyerhans, Nänikon (CH); Andreas Metzger, Männedorf (CH); Marcel Schütz, Uster (CH); Matthias Scheu, Uster (CH); Jean-Christophe Emery, Zürich (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 11/365,874

(22) Filed: Mar. 2, 2006

(65) Prior Publication Data

US 2006/0207804 A1     Sep. 21, 2006

(30) Foreign Application Priority Data

Mar. 2, 2005     (EP)     ................. 05101587

(51) Int. Cl.
*G01G 9/00*     (2006.01)
*G01G 21/00*    (2006.01)

(52) U.S. Cl. ........................................ 177/1
(58) Field of Classification Search ............ 177/1, 177/210 EM, 212, 229
See application file for complete search history.

(56) References Cited

U.S. PATENT DOCUMENTS

| | | | |
|---|---|---|---|
| 4,711,314 A * | 12/1987 | Suzuki et al. ............. 177/164 |
| 5,396,817 A * | 3/1995 | Rosensweig ............... 73/146.2 |
| 6,615,638 B1 | 9/2003 | Lochner et al. |
| 7,076,990 B2 * | 7/2006 | Yoshikuwa ................. 73/1.13 |
| 2003/0218467 A1 | 11/2003 | Carlson et al. |
| 2007/0068283 A1 * | 3/2007 | Gleghorn et al. |

FOREIGN PATENT DOCUMENTS

| | | |
|---|---|---|
| DE | 199 20 494 A1 | 6/2000 |
| DE | 102 42 118 A1 | 11/2003 |
| JP | 1-212327 | 8/1989 |
| JP | 2006-242954 A * | 9/2006 |

* cited by examiner

*Primary Examiner*—Randy W. Gibson
(74) *Attorney, Agent, or Firm*—Buchanan Ingersoll & Rooney PC

(57) ABSTRACT

A device to weigh substantially uniform weighing objects has a plurality of weighing modules and an equal number of load carriers that have central lengthwise axes extending in the direction of the load. Each of the load carriers is connected, respectively, to one of the weighing modules through a force-transmitting rod, and the load carriers are disposed in a given spatial or two-dimensional arrangement in which the distances between neighboring central lengthwise axes are smaller than the largest lengthwise extension of the respective weighing modules.

19 Claims, 4 Drawing Sheets

DEVICE FOR WEIGHING SUBSTANTIALLY UNIFORM WEIGHING OBJECTS

RELATED APPLICATION

This application claims priority to European Patent Application 05101587.3 filed in Europe on Mar. 2, 2005, the entire contents of which are hereby incorporated by reference.

FIELD

A device is disclosed which serves to weigh objects that are substantially uniform among each other, wherein the device has a plurality of weighing modules and an equal number of load carriers that have a central lengthwise axis extending in the direction of the load, wherein each of the load carriers is connected to one of the weighing modules, and wherein the load carriers are arranged in a given spatial or two-dimensional pattern in which the distances between neighboring central lengthwise axes are smaller than the largest lengthwise extension of a weighing module.

BACKGROUND INFORMATION

Exemplary devices in automated production- and testing systems include balances of a modular configuration—so-called weighing modules—particularly well suited to be integrally incorporated into these systems. In essence, the balances used for this purpose are of the type where the indicator unit is arranged separately from the balance, for example in a system with a central indicator unit for a plurality of weighing modules. Instead of being presented through an indicator, the weighing results can also be delivered from the weighing modules to a process control system. Integrated weighing modules of this kind are used in systems for the production and testing of small and relatively expensive parts, for example in filling- and packaging machines for tablets, capsules, ampoules, etc. in the pharmaceutical industry, or in the checking of ball bearings.

In cases where speed is important in measuring the individual masses of weighing objects, an arrangement of a plurality of weighing modules suggests itself, for example to allow the individual masses of weighing objects of the same kind to be measured in parallel. Since a conveyor device such as a robotic arm with multiple grippers is normally used to put the weighing objects in parallel onto the individual load carriers of the weighing modules and to remove them from there after they have been weighed, the positions of the individual load carriers in relation to each other and in relation to the conveyor device have to be accurately and durably set.

Devices which are used for weighing substantially uniform weighing objects belong to the known state of the art. Predominantly, these devices are arrangements of weighing modules in rows or two-dimensional arrays. Other arrangements are based on the concept of placing the weighing modules in a star-like arrangement around a row arrangement of load carriers which have to be matched to the distances between the delivery elements of an—in most cases existing—conveyor device, because the weighing module is often too large to allow an arrangement at the required close intervals.

A row arrangement of weighing modules is disclosed in DE 102 42 118 A1 and DE 199 20 494 A1, wherein four weighing modules are arranged in a row in an apparatus for weighing pharmaceutical receptacles, in particular ampoules, wherein before and after the filling the receptacles are brought to and removed from the weighing modules by means of a gripper device.

A two-dimensional arrangement of weighing cells is disclosed in JP 01 212327 A, which describes a cost-effective method of producing a large number of weighing cells from a plate of spring material to which strain gauges are bonded as sensor elements.

Disclosed in US 2003/0218467 is a matrix array of microbalances which can be used with preference in the field of combinational chemistry for the determination of masses or mass changes in the microgram range. Each of the individual microbalances has a mechanical resonator as a sensor whose resonance behavior correlates to a mass or a change in the mass detected by the sensor.

A two-dimensional star-shaped arrangement of weighing modules is disclosed in U.S. Pat. No. 6,615,638 B1, which finds application in a calibration device for multi-channel pipettes. This arrangement is suitable for matching the distances between the load carriers, each of which belongs to one of the weighing modules, to the tips of the multi-channel pipette that is to be calibrated. The weighing receptacles, each of which is filled with the calibration liquid dispensed from one of the channels of the multi-channel pipette, can thus be weighed simultaneously, although the dimensions of the weighing modules which function according to the principle of electromagnetic force compensation are larger than the distance interval that the load carriers need to conform to.

The state-of-the-art microbalances as described in US 2003/0218467 have a disadvantage that, while being suitable for applications where masses in the microgram range need to be determined, they are not, for example, suited for the range of milligrams to grams. In the case of weighing modules with large dimensions in comparison to the distances between the delivery elements of a conveyor device, even the star-like arrangement disclosed in the state of the art does not satisfy the requirements when a complex conveyor device is used, in particular of a type that is equipped with a two-dimensional arrangement of delivery elements. Since the dimensions of the weighing modules in length as well as width are often larger than the required distance between the central lengthwise axes of the load carriers, only a limited number of weighing modules can be placed around a provided area that is predetermined by the delivery elements of the conveyor device.

SUMMARY

An arrangement of load carriers is disclosed that can be adapted to a complex conveyor device for weighing objects which has small distances between the delivery elements. An arrangement of weighing modules that are connected with the load carriers is also disclosed.

As disclosed herein, an exemplary device which serves to weigh substantially uniform weighing objects has a plurality of weighing modules and an equal number of load carriers. Each of the load carriers has a central lengthwise axis and is connected to one of the weighing modules by means of a force-transmitting rod. The load carriers are disposed in a given spatial or two-dimensional arrangement in which the distances between neighboring central lengthwise axes are smaller than the largest dimension of the weighing modules associated with the load carriers. The weighing modules are arranged in at least two planes, one above the other, forming a row and/or a two-dimensional array in each of the planes.

The weighing of substantially uniform weighing objects (e.g., of weighing objects of the same kind) as well as the so-called batch-weighing, are processes where a plurality of loads have to be weighed individually, be it for the purpose of checking, dosage-dispensing, or filling, etc. in a confined space. The number of planes on which the weighing modules can be arranged depends on the dimensions of the weighing modules and on the required number of load carriers, with the latter number, in turn, being affected by the way in which the weighing objects are delivered to the load carriers.

In an exemplary embodiment of the device for weighing substantially uniform weighing objects, the weighing modules of one plane are arranged in an offset position in relation to the modules of the plane below and/or above.

The load carrier within the present context should be envisaged as a device of any shape which serves the purpose of receiving the object that is to be weighed. Within the constraints of the given arrangement of the load carriers of the device for the weighing of like objects, a prerequisite in exemplary embodiments for the design of a load carrier is that it conforms to the given spatial or two-dimensional arrangement, meaning that the load carrier is limited in regard to its spatial dimensions. The distances of the load carriers among each other, i.e. the distances of their respective central axes, as well as the arrangement of the load carriers within the device can be adapted to the delivery elements of a conveyor device. Accordingly, the central lengthwise axes of the load carriers can be arranged at regular intervals from each other. In special embodiments, all of the load carriers are arranged in a plane that extends orthogonal to the direction of the force vector of a load, or they may be arranged in several planes at positions that are in part vertically offset relative to each other.

In another exemplary embodiment of the device for the weighing of substantially uniform weighing objects, a force-transmitting rod connected to a weighing module that is arranged on a lower plane is lengthened in comparison to a force-transmitting rod of a weighing module on a higher plane and may be provided with a sleeve to protect the force-transmitting rod. The difference in the preloads for different weighing modules which is due to the lengthening of the force-transmitting rod can be compensated. This compensation can be accomplished by means of a supplemental weight which is connected to the movable parallelogram leg of each weighing cell that belongs to a weighing module without a lengthened force-transmitting rod. This supplemental weight equals the weight that would, for example, be added by a lengthened force-transmitting rod. A supplemental weight is also provided for those weighing modules whose extension of the force-transmitting rod is not equal to the maximum length of a force-transmitting rod in the device. A supplemental weight which is interchangeable in a preferred embodiment of a weighing module can also serve the purpose of compensating for different sizes of weighing pans, or different sizes of the load carrier. The former as well as the latter can be interchangeable in order to provide flexibility in the use of the device for weighing substantially uniform weighing objects. However, for a given application of the device for weighing substantially uniform weighing objects or weighing objects of the same kind, the load carriers of the weighing modules used can all be of the same design.

The weighing modules in a device for weighing substantially uniform weighing objects can be arranged in different ways. For example, all weighing modules of one plane are arranged in a row, or in two rows lying opposite each other, where the weighing modules of the plane below and/or the plane above can be arranged with a translatory offset relative to the weighing modules of a row in the first-mentioned plane.

As a further exemplary arrangement of the weighing modules, all weighing modules of a plane are positioned in a star-like pattern surrounding the arrangement of the load carriers wherein relative to these weighing modules, the weighing modules of the planes below and/or above are arranged with a translatory offset and an angular offset.

In yet another exemplary embodiment of the device for weighing substantially uniform weighing objects, the planes are separated from each other by support platforms. In particular, they are spaced apart from each other by support elements.

The weighing modules of the lowest plane can be arranged on a base plate. To ensure that a weighing module can be installed so that it will precisely fit into the surroundings where it is used, in this case on a support platform or on the base plate, a device can be provided for the positioning of the weighing module which has a spatial reference to the position of the load carrier. The load carrier and the device for the positioning of the weighing module can be arranged on the same central lengthwise axis. The positioning device works together with a matching counterpart of the support platform or of the base plate.

The weighing modules in the device for the weighing of substantially uniform weighing objects are arranged in particular in such a way that they can be exchanged individually. If, for example, they are of uniform design. This enhances the service-friendliness of a device for the weighing of substantially uniform weighing objects as described herein. To allow individual weighing modules to be exchanged in a simple way, it may further be necessary to design the force-transmitting rod so that it can be separated from the weighing module.

In the case where the objects are delivered to the load carriers by a conveyor device, a malfunction of the latter can cause a randomly directed overload or transverse load to be applied to the load carrier and thus to the force-transmitting rod and the weighing cell of a weighing module. The weighing modules that are used in a device of the foregoing description therefore can include an overload protection device which uncouples the weighing cell from an overload in the direction of the load, transverse forces orthogonal to the direction of the load, and possibly from torques as well. Each load receiver, in particular the force-transmitting rod for a weighing module, is therefore equipped with an overload protection device. In a device for weighing substantially uniform weighing objects as described herein, a load receiver comprises at least a force-transmitting rod and a load carrier.

Each weighing module of the device for the weighing of substantially uniform weighing objects is enclosed by a housing which has a shape that narrows down on the sides and/or from above towards the load receiver. This contributes to reducing the space requirement in a star-shaped arrangement. Also, the heat distribution inside the housing can be optimized in that the narrowing down of the housing from above keeps the heat away from the load receiver.

In a method for weighing substantially uniform weighing objects with a device according to an exemplary embodiment of the invention, a conveyor device puts the weighing objects either simultaneously on all of the load carriers, or simultaneously on all load carriers of a row in a matrix grid of equidistant load carriers, or sequentially on each load carrier of an arrangement of load carriers.

The device for the weighing of substantially uniform weighing objects i.e. for weighing objects of the same kind is suited for the dispensing of doses of powders into appropriate containers, the filling of hard gelatin capsules, the filling of ampoules or vials, and also in particular the checking of individual relatively expensive parts and in certain cases the checking of weighing objects that have already been filled or packaged. In performing a weighing process, the weighing objects can be put on all of the load carriers simultaneously by means of a conveyor device, or simultaneously on all load carriers of a row in a matrix grid of equidistant load carriers, or sequentially on each load carrier of an arrangement of load carriers. With the device for the weighing of substantially uniform weighing objects, it is also possible to sequentially put different weighing objects on each load carrier of the device, for example to dissolve powders in a liquid.

DESCRIPTION OF THE DRAWINGS

The invention will hereinafter be described through examples that are represented schematically in the drawings, wherein.

DETAILED DESCRIPTION

Figure 1:
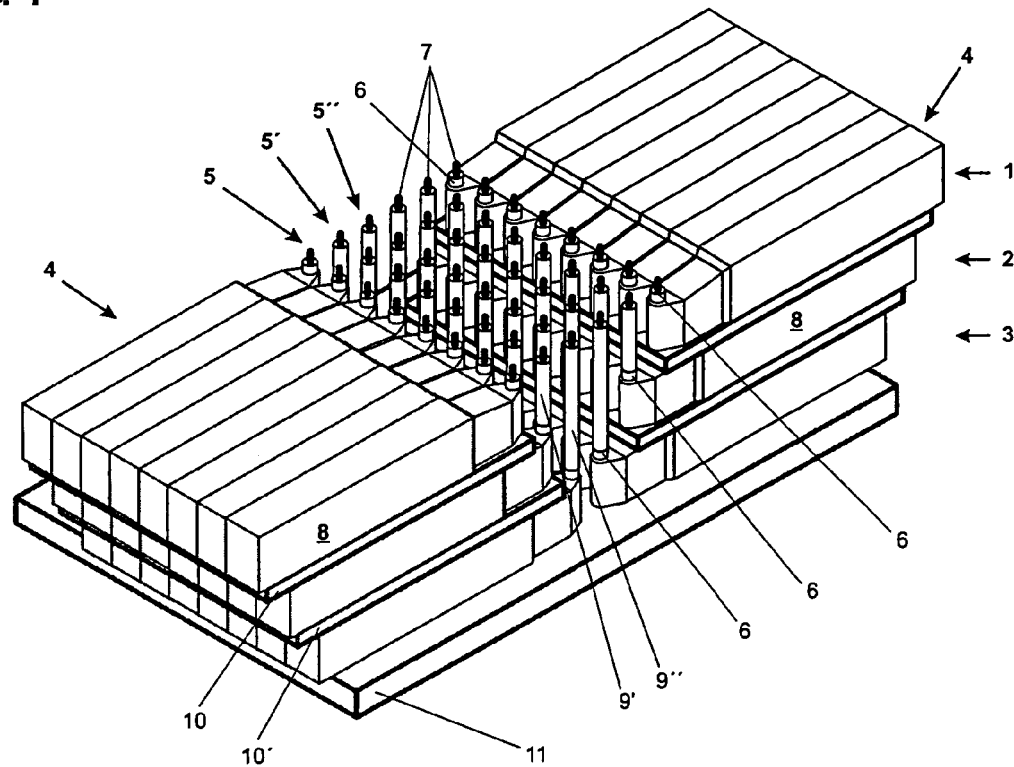
FIG. 1 represents a perspective view of an exemplary device for the weighing of substantially uniform weighing objects, wherein the weighing modules are arranged on three planes above each other, with two rows of weighing modules running parallel to each other on each plane.

FIG. 1 shows in three-dimensional representation a device for the weighing of substantially uniform weighing objects that is built up from a total of forty-eight individual weighing modules 4. The weighing modules are arranged in three planes 1, 2, 3 on top of each other, forming in each of the planes 1, 2, 3 two rows of weighing modules 4 running parallel to each other, wherein the weighing modules 4 of the first plane 1 are arranged with a translatory offset in relation to the weighing modules of the second plane 2, in this case in the lengthwise direction of a weighing module 4. A weighing module 4 of the type illustrated here has a large lengthwise dimension in comparison to its width. The reason for this will be explained hereinafter in the context of FIG. 6.

Figure 2:
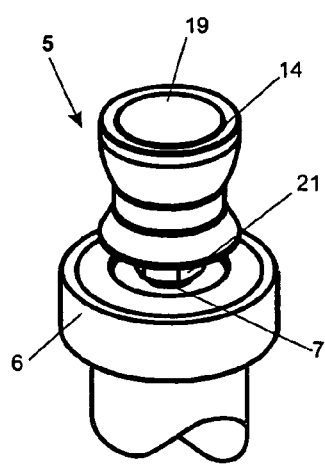
FIG. 2 represents a perspective view of an exemplary load carrier that is attached to the force-transmitting rod of a load receiver for a weighing module of a device according to FIG. 1.

Each of the weighing modules has a load receiver 5, 5', 5", with the load receivers 5, 5', 5" being arranged at regular intervals from each other. A load receiver 5, 5', 5" comprises at least a force-transmitting rod as well as a load carrier, with the load carrier (see FIG. 2) being connected by means of a force-transmitting rod (not visible in this drawing) to the load-receiving area of a weighing cell (likewise not shown here) inside the housing 8 of each of the weighing modules 4. The load carriers are symbolically indicated in FIG. 1 by a setup bolt 7 forming the end of the force-transmitting rod, so to speak. This is significant in connection with the illustrated device for the weighing of substantially uniform weighing objects insofar as any kind of load carrier or any kind of weighing pan can be put in place on the setup bolt 7, as long as their dimensions are smaller than the distance between neighboring load receivers 5, 5', 5", so that a specific application can be accommodated in which the device for the weighing of substantially uniform objects is used. A weighing pan of the kind that is used, e.g. to receive a hard gelatin capsule that is to be filled is shown in FIG. 2. Each of the load receivers 5, 5', 5" shown in FIG. 1 has a base element 6 which protectively surrounds the force-transmitting rod.

Figure 7:
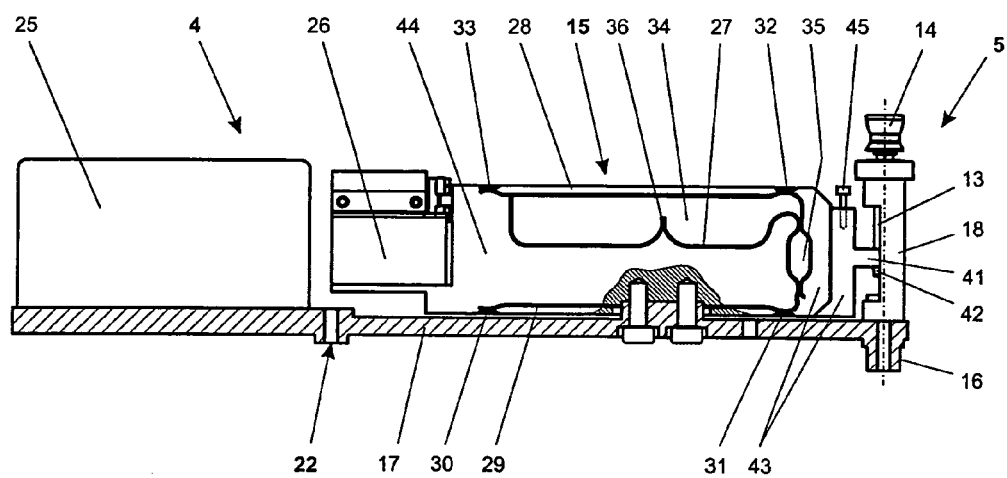
FIG. 7 represents an individual weighing module without housing in a side view.

The load receivers 5', 5" connected to the weighing modules of the second plane 2 and the third plane 3 are lengthened in relation to those of the first plane 1, so that all of the setup bolts 7 or the weighing pans installed on them, as shown, e.g. in FIG. 2, lie in one plane that extends orthogonal to the direction of the gravity force. The lengthening of the load receivers 5', 5" is constituted by an extended force-transmitting rod (not visible here) as well as a sleeve 9, 9' surrounding the force-transmitting rod. To compensate for the different masses which, due to the extended force-transmitting rod, are acting on the load-receiving areas of the weighing cells, the weighing modules of the first plane 1 have a first supplemental weight and the weighing modules of the second plane have a second supplemental weight, whereby the mass difference caused by the elongated force-transmitting rod of a weighing module of the second plane 2 or of the third plane 3 is exactly compensated. A supplemental weight of this kind and its arrangement on a weighing module are shown in FIG. 7.

The weighing modules of each row of a plane are fastened to a support platform 10, 10'. The support platform 10 in this arrangement separates the first plane 1 from the second plane 2, and the support platform 10' separates the second plane 2 from the third plane 3. A base plate 11, configured here in one continuous piece, supports the entire setup of the device for the weighing of substantially uniform weighing objects. To lend the required degree of stability to the entire device for the weighing of substantially uniform weighing objects, the support platforms 10, 10' are connected to the base plate 11 in a known manner which is not illustrated in detail in the drawing.

In the device for the weighing of substantially uniform weighing objects which is shown in FIG. 1, the width of a weighing module 4, or more specifically of the housing 8 of the latter, conforms exactly to the interval between two load receivers 5, 5', 5", or between their load carriers, within a row that extends perpendicular to the lengthwise dimension of a weighing module 4. The distance between the load receivers 5, 5', 5" in the direction of the lengthwise dimension of a weighing module 4 is determined by the offset between the weighing modules 4 of different planes. The offset in the illustrated arrangement is in the lengthwise direction of a weighing module 4, so that the load carriers of the load receivers 5, 5', 5" form a six-by-eight matrix arrangement of fields of equal magnitude. However, there could also be an additional offset in a lateral direction, i.e., perpendicular to the lengthwise dimension of a weighing module, so that the load carriers in adjacent rows would be offset relative to each other.

The housing 8 of each weighing module 4 is narrowed down towards the load receiver 5, 5', 5". This provides the possibility for different arrangements of the weighing modules 4 in relation to a load carrier matrix, as will be described hereinafter in detail through FIGS. 5 and 6.

FIG. 2 shows a perspective representation of a load carrier that is attached to a load receiver 5. The load carrier is in this case a weighing pan 14 that is suitable to receive hard gelatin capsules which are to be filled. By means of a fastening element in the form of an internally threaded hexagonal nut 21, the weighing pan 14 is screwed onto a receiving bolt 7 which in this case has an external screw thread. The weighing pan has a large height in relation to its diameter, so that the opening 19 which receives the hard gelatin capsule or another sample or sample container, for example a vial, can be configured in a deeply recessed shape. Thus, a secure positioning of the sample or sample container can be achieved.

Figure 3:
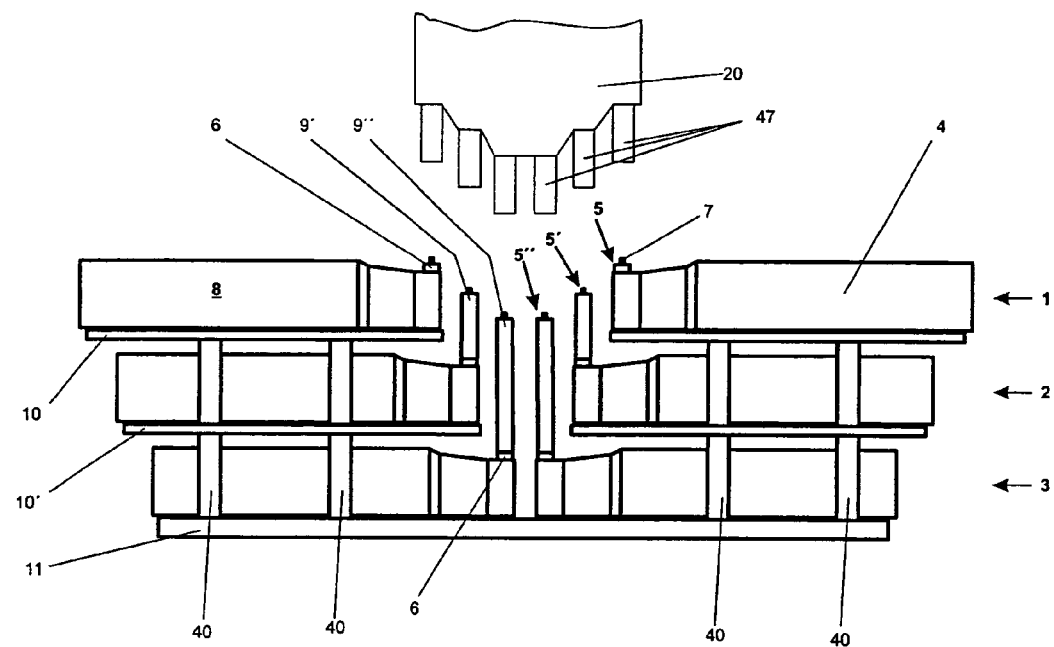
FIG. 3 represents an exemplary device that is analogous to the device shown in FIG. 1, seen here from the side together with a conveyor device, with the load carriers being arranged in this case with a vertical offset relative to each other.

FIG. 3 shows a side view of a device for the weighing of substantially uniform weighing objects similar to the device of FIG. 1. The offset in the direction of the lengthwise dimension of a weighing module 4, which is equal to the distance of the load receivers 5, 5', 5" of two adjacent rows, can be seen clearly. In contrast to the weighing modules 4 shown in FIG. 1, the weighing modules 4 shown in FIG. 3 are connected to load receivers 5, 5', 5" which are configured so that the load carriers will be vertically offset relative to each other. In other words, the respective extender elements of the load receivers 5, 5', 5" provide different elongations of the force-transmitting rods and surrounding sleeves 9' than in the arrangement of FIG. 1.

To what extent the load carriers of the load receivers 5, 5', 5" are offset relative to each other within a plane or in the vertical direction depends on the arrangement of the delivery elements 47 of a conveyor device, which serve to deliver the objects to be weighed to the individual load carriers. A conveyor device 20 is schematically indicated in the drawing, although it is not a subject of the invention.

The support platforms 10, 10' rest on the base plate 11 through column posts 40, which can be fastened in any desired way in a manner that is known per se.

Figure 4:
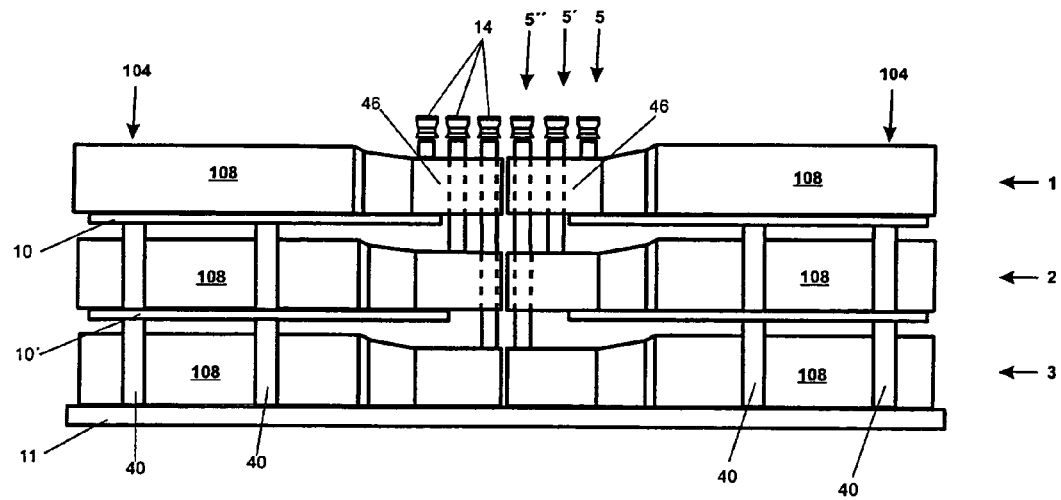
FIG. 4 represents a side view of another embodiment of a device for the weighing of substantially uniform weighing objects.

FIG. 4 shows a side view of a device for the weighing of substantially uniform weighing objects, wherein the weighing modules 104 arranged in the three planes 1, 2, 3 are not offset relative to each other. Nevertheless, the load carriers associated with the weighing modules, configured here as weighing pans 14 of the type shown in FIG. 2, form a two-dimensional array, because the force-transmitting rods of the load receivers 5, 5', 5" of the weighing modules 104 from different planes 1, 2, 3 can be connected at different positions to the load-receiving area of the movable parallelogram leg (not shown here, see FIG. 7) of the respective weighing cell. To realize this concept, the movable parallelogram leg may for example have an extension in the lengthwise direction of the weighing module 104, so that three receiving positions for a force-transmitting rod are available in the load-receiving area. However, an extension of this kind can also be formed by a horizontal part of the force-transmitting rod, wherein this horizontal part is of different length for weighing modules 104 of different planes. Because of the extension, the housing 108 of the weighing module 104 likewise has an extension 46 in the respective area. The load receivers 5', 5" of the weighing modules 104 from the lower planes 3, 2 pass through the housings 108 of the weighing modules 104 above them and in some cases also through the movable parallelogram legs of the latter. This is indicated by the broken lines in FIG. 4. Appropriate bore holes (not shown) need to be provided for this purpose.

Figure 5:
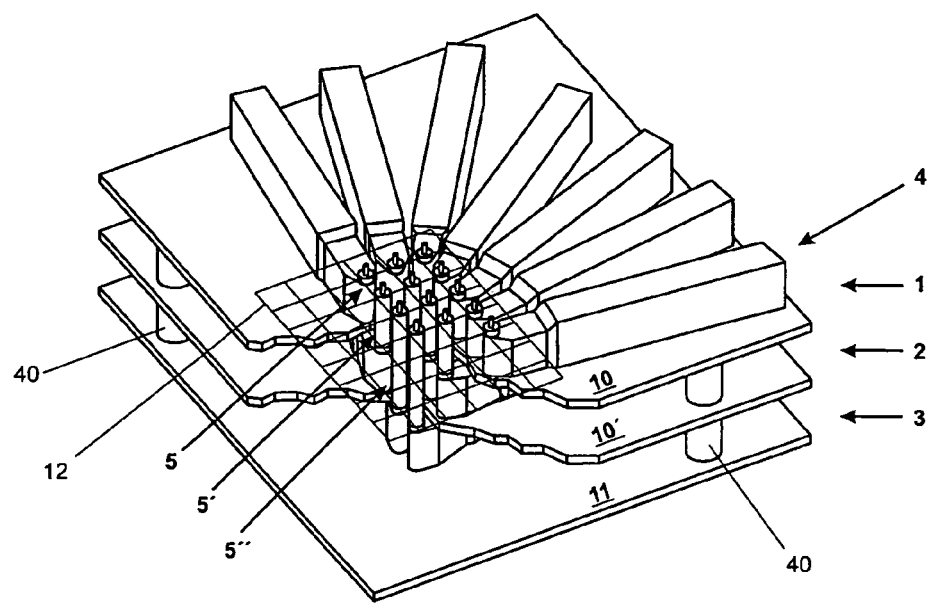
FIG. 5 shows a further embodiment of a device for the weighing of substantially uniform weighing objects in a perspective representation, wherein the weighing modules in each plane are arranged star-like around the area of a grid matrix of load carriers.

FIG. 5 shows a further embodiment of a device for the weighing of substantially uniform objects in a perspective view, wherein the weighing modules 4 in each of the planes 1, 2, 3 are arranged in the shape of a star surrounding the area of the load carrier grid 12 (graphically indicated by gridlines), as illustrated for the first plane 1 in the drawing. For the sake of clarity, only thirteen of the forty-eight weighing modules are shown; the arrangement of the rest of the weighing modules will be self-evident for those with a general knowledge of the field of the invention. In this case, too, the weighing modules 4 are laterally offset in relation to each other in order to allow the grid-like arrangement of the load carriers. The support plates 10, 10' are shown broken off in the area of the load carrier grid 12 in order to indicate the second plane 2 and the third plane 3 lying, respectively, below the plates 10, 10'. In the area where a load receiver passes through the support plates 10, 10', the latter have an opening which can be either an individually formed opening for each of the load receivers 5', 5" or configured as a common opening for the load receivers 5', 5" of the weighing modules of the lower planes 2, 3.

The load carriers of the weighing modules 4 of the third plane 3 are arranged at the center of the load carrier grid, those of the second plane 3 in an intermediate area, and those of the first plane 1 in the outer area of the grid matrix 12 of the load carriers. Of course, the reverse arrangement could also be realized.

A star-like arrangement of this kind is particularly advantageous if the width of the weighing modules 4 is larger than the interval between the load receivers 5, 5', 5" and in particular between the load carriers, and it has also proven useful if the widths of the housings 8 of the weighing modules 4 are narrowed down towards the load receiver 5, 5', 5". FIG. 5 also shows a further way of narrowing down the housing 8 of a weighing module 4 in the vertical direction, which can also be seen in FIGS. 1, 3 and 4.

Figure 6:
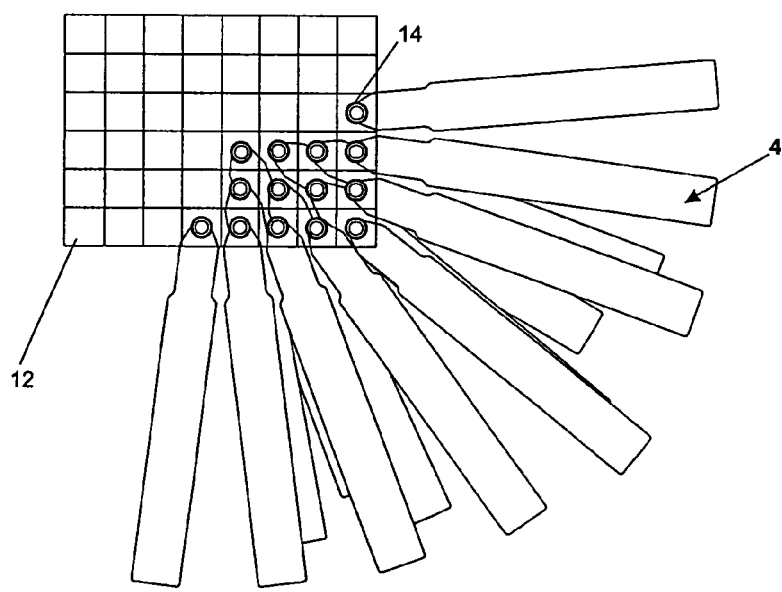
FIG. 6 represents a plan view of the device of FIG. 5 with load carriers installed, wherein the support platforms that separate the planes from each other and the base plate have been omitted.

FIG. 6 shows a plan view of a star-like arrangement of the weighing modules 4 in several—in this case three—planes on top of each other. For the sake of clarity, the support plates 10, 10' as well as the base plate 11 have been omitted from the drawing. The lateral offset of the weighing modules 4 of the different planes 1, 2, 3 consists here on the one hand of a translatory offset particularly in the lengthwise direction of the weighing modules 4 and on the other hand of an angular offset of the position of each of the load receivers 5, 5', 5". This allows a grid matrix 12 of load carriers—represented here by the weighing pans 14—to be formed in a relatively compact space without having to limit the weighing modules 4 to commensurately small dimensions.

The weighing objects, which may be pharmaceutical capsules that are to be filled or other materials such as, e.g., doses of pulverous or liquid substances which have to be filled into small receptacles, can now be weighed either simultaneously or sequentially. It is also possible, for example in a device for the weighing of substantially uniform objects in which the load carriers are arranged in a regular pattern, i.e. in a grid matrix 12 of load carriers, to weigh the objects in each row simultaneously, one row after another. However, the all-at-one-time simultaneous weighing is often preferable because it saves time.

FIG. 7 shows a side view of an individual weighing module 4, for example one of the modules of the first plane 1 (see for example FIG. 1) with the top of the housing taken off and the bottom part 17 drawn in cross-section. Installed on the bottom part 17 are a weighing cell 15 with its appurtenant force-compensation device 26 and the signal-processing module 25. The weighing cell 15 includes a force-transmitting device formed of an essentially brick-shaped block of material containing material portions that are separated from each other by narrow linear cuts 27 which traverse the material block in the perpendicular direction to its largest sides. The material portions form a parallelogram with an upper parallelogram guide 28 and a lower parallelogram guide 29, a stationary parallelogram leg 44, and a movable parallelogram leg 43. The parallelogram legs 43, 44 and the parallelogram guides 28, 29 are connected to each other through concave-shaped flexure joints 30, 31, 32, 33 which are delimited by material-free spaces. A force-transmitting lever 34 is formed by further material portions inside the material block. The stationary parallelogram leg 44 of the weighing cell 15 is rigidly connected to the bottom part 17.

The movable parallelogram leg 43 is connected to the shorter arm of a lever 34 through a coupling element 35 which is rigid in the lengthwise direction but capable of bending elastically. The lever 34 is supported by a flexure fulcrum 36 on a portion of the stationary parallelogram leg 44 that projects into the interior of the material block. This design concept for a force-transmitting device has the advantage of a high degree of rigidity combined with a compact design volume. The parallelogram 28, 29, 43, 44, the coupling element 35, as well as the lever 34 and the flexure fulcrum 36 are delimited by material-free portions in the form of narrow linear cuts 27 in the material block. These linear cuts 27 are made preferably by means of spark erosion with an erosion wire. The force compensation device 26 is coupled to the force-transmitting lever 34 by way of a lever extension which is not shown in this drawing.

The movable parallelogram leg 43 has a projection 41 that is formed at an intermediate height of the parallelogram leg 43 and points away from the stationary parallelogram leg 44. A force-transmitting rod 13 is fastened to the projection 41 by means of a fastener element 42, for example a screw bolt, and extends parallel to the largest side of the material block and perpendicular to the lengthwise direction of the parallelogram guides 28, 29. Thus, the projection 41 and the fastener element 42 constitute the load-receiving area of the movable parallelogram leg 43. A weighing pan 14, in this case configured to hold hard gelatin capsules, is attached as a load carrier to the end of the force transmitting rod 13 that points away from the projection 41. The force-transmitting rod 13 is partially enclosed by an internal housing part 18. A supplemental weight 45 in the form of a screw is attached to the movable parallelogram leg 43. As mentioned above in the context of FIG. 1, the supplemental weight serves to compensate for the elongated force-transmitting rods 13 of the load receivers 5', 5" in order to set a uniform preload for all of the weighing modules 4.

On the opposite side from the weighing cell, the bottom part 17 has a fastening area 22 that stands out from the bottom part 17, and a likewise protruding positioning device 16. This arrangement proves particularly advantageous if the central lengthwise axis of the positioning device 16 coincides with the central lengthwise axis of the load receiver 5 when the latter is in its operating position. Thus, the position of the load receiver 5 is defined by the position of the positioning device 16 or by a recess that serves to receive the positioning device 16, preferably a bore hole, in the support platform 10 which is not shown in this drawing (see FIGS. 1 and 3 to 5).

The weighing modules 4, 104 are arranged in such a way in the device for the weighing of substantially uniform objects that they can be individually exchanged. This means that in a service case an individual weighing module 4, 104 can be removed from the support platform 10, 10' or from the base plate 11 of the respective plane 1, 2, 3 and replaced without interfering with the position of other weighing modules 4, 104. The precisely positioned reinstallation of an exchanged weighing module 4, 104 is ensured by means of the positioning device 16. The latter engages a matching recess, preferably a bore hole, in the support platform 10, 10' or in the base plate 11 and thus sets the position for the load receiver 5, 5', 5". The fastening area 22 likewise engages a matching recess in the support platform 5, 5' or in the base plate 11 and can in addition be secured by a fastening means if desired, for example a screw or a bolt.

The conditions for a fast and problem-free exchange of the weighing modules 4, 104 are created in this case by choosing on the one hand a large enough distance between the support platform 10, 10' and the base plate 11 as well as from one support platform 10, 10' to the other. As a further requirement for the exchangeability of individual weighing modules 4, 104, the load receivers 5, 5', 5" have to be connected to their respective weighing cells 15 in such a manner that they are at least in part removable. This can be achieved, e.g., with a design where the load receivers 5', 5" have an extension that is removable from the base elements 6.

Figure 8:
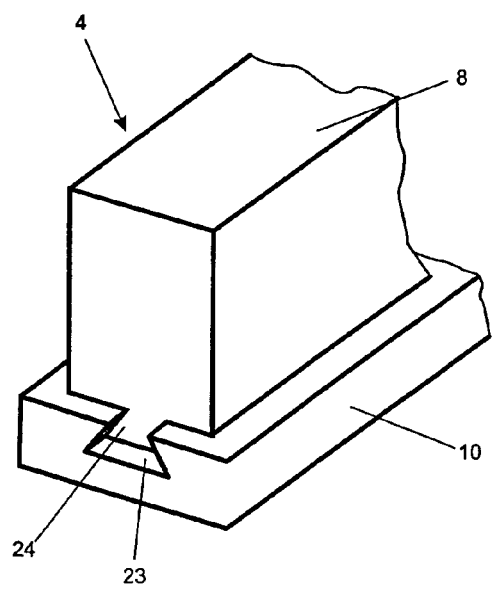
FIG. 8 represents a perspective view of an exemplary weighing module, looking at the side that faces away from the load receiver, to illustrate a detail of the area of attachment of the weighing module to a base plate or a support platform.
Figure 9:
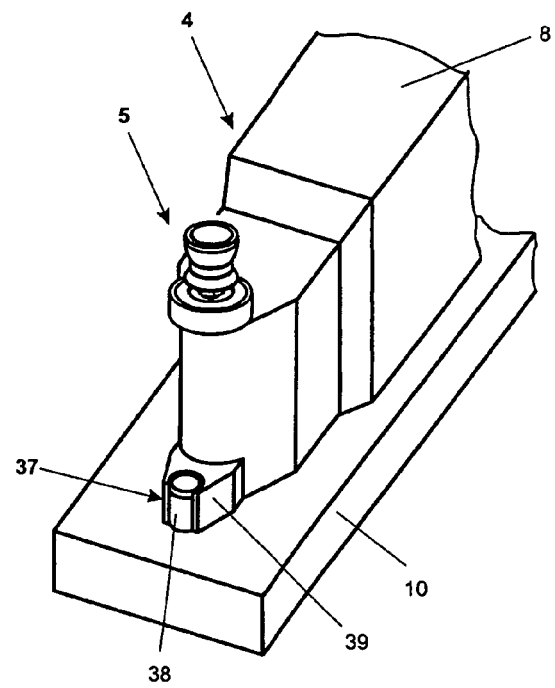
FIG. 9 represents a perspective view of an exemplary load-receiver side of a weighing module, showing a detail of the area of attachment of the weighing module to a base plate or a support platform.

FIGS. 8 and 9 illustrate further possibilities of fastening and guiding a weighing module 4 on its respective support platform 10, 10' or on the base plate 11. In FIG. 8, which shows a fragmentary view of the rear portion, i.e., the part of the weighing module that faces away from the load receiver 5, 5', 5", the rearward end portion of the weighing module 4 is fastened on a support platform 10 by means of a so-called dovetail connection. With this form of connection, the support platform 10 has a recess 23 of trapezoidal cross-section in which a projection 24 that is connected to the housing 8 of the weighing module 4 is engaged and guided as a matching counterpart. The recess 23 as well as the projection 24 can extend over the entire length of the housing 8 or only over part of it, for example over the rear portion. In the latter case the anterior portion of the weighing module 4, i.e. the part that is equipped with the load receiver 5, can be secured and guided by a snap-fastener device 37 of the type shown in FIG. 9. This snap-fastener device 37 includes a bolt 38 that is connected to the support platform 10 and which in the engaged condition is embraced by a bracket 39 that is connected to the housing 8 of the weighing module 4. For the fastening of the weighing module 4 to the support platform 10 as well as its release it is advantageous if the bracket 39 consists of a spring-like material. Besides, a snap-fastener device of this kind can also be arranged on the central lengthwise axis of the load carrier. With the fastening arrangement of a weighing module 4 according to the foregoing description, the distance of the support platforms 10, 10' from each other and from the base plate 11 can be kept small, whereby the possibility for a compact design of the device for the weighing of substantially uniform objects is strongly improved and, as a consequence, the sensitivity to vibrations is reduced.

Further embodiments for a simple release and connection of a weighing cell module 4, 104 on a support platform 10, 10' or on the base plate 11 are conceivable and will be immediately evident to those skilled in the art. The inventive device for the weighing of substantially uniform weighing objects has been described and illustrated in various exemplary embodiments. However, based on the teachings of the present invention, additional design configurations can be realized by individuals of ordinary skill in the pertinent art. Such variations are also within the scope of the present disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A device for weighing substantially uniform weighing objects, comprising:
   a plurality of weighing modules;
   an equal number of load carriers which have a central lengthwise axis oriented in the direction of the load; and
   at least one force-transmitting rod, each of said load carriers being connected with one of the weighing modules by the at least one force-transmitting rod, wherein said load carriers are disposed in a given spatial or two-dimensional arrangement in which the intervals between neighboring central lengthwise axes are smaller than the maximum dimension of the associated weighing modules, wherein the weighing modules are arranged in at least two planes on top of each other and wherein the respective weighing modules in each plane form at least one of: a row arrangement and a two-dimensional arrangement.

2. The device according to claim 1, wherein the weighing modules in a plane are arranged in an offset position relative to the weighing modules in another plane.

3. The device according to claim 1, comprising:
   delivery elements of a conveyor device, wherein the distances of the central lengthwise axes of the load carriers from each other as well as their arrangement in the device are matched to the delivery elements of a conveyor device.

4. The device according to claim 1, wherein the central lengthwise axes of the load carriers are arranged at regular intervals.

5. The device according to claim 1, wherein all of the load carriers are arranged in a plane that extends orthogonal to the direction of the force vector of a load.

6. The device according to claim 1, wherein the load carriers are arranged in part with a vertical offset relative to each other so that they lie in a plurality of planes.

7. The device according to claim 1, wherein a force-transmitting rod connected to a weighing module that is arranged on a lower plane has an increased length in relation to a force-transmitting rod connected to a weighing module that is arranged on a plane lying above said lower plane.

8. The device according to claim 7, wherein a weighing module comprises a weighing cell with a stationary parallelogram leg and a vertically displaceable parallelogram leg.

9. The device according to claim 8, comprising a supplemental weight connected to the displaceable parallelogram leg of a weighing module, said supplemental weight serving to compensate for absence of weight of said increased length in a weighing module that is not equipped with a force-transmitting rod of increased length.

10. The device according to claim 1, wherein all weighing modules of a first plane are arranged in one row or in two rows that lie opposite each other, the weighing modules of a plane lying above or below being arranged with a translatory offset relative to the weighing modules of the first plane.

11. The device according to claim 1, wherein all weighing modules of a first plane are arranged in a star-shaped pattern, wherein the weighing modules of another plane lying above or below are arranged with an angular offset relative to said weighing modules of the first plane.

12. The device according to claim 1, wherein the planes are separated from each other by support platforms and spaced apart by support columns.

13. The device according to claim 12, wherein the device is arranged on a base plate, and each weighing module has a positioning device which cooperates with a matching counterpart of the support platform or the base plate.

14. The device according to claim 13, wherein the positioning device is arranged on the central lengthwise axis of the load carrier.

15. The device according to claim 1, wherein each load carrier of a weighing module is equipped with an overload protection device.

16. The device according to claim 1, wherein each weighing module has a housing designed with a shape which in a direction towards the load carrier and towards the force-transmitting rod narrows down from at least one of: a side, and from above.

17. The device according to claim 3, wherein the central lengthwise axes of the load carriers are arranged at regular intervals.

18. The device according to claim 3, wherein all of the load carriers are arranged in a plane that extends orthogonal to the direction of the force vector of a load.

19. The device according to claim 3, wherein the load carriers are arranged in part with a vertical offset relative to each other so that they lie in a plurality of planes.

* * * * *